(12) United States Patent
Song et al.

(10) Patent No.: US 11,215,569 B2
(45) Date of Patent: Jan. 4, 2022

(54) CT TRIAXIAL TEST APPARATUS FOR HYDRATE-BEARING SEDIMENT

(71) Applicant: DALIAN UNIVERSITY OF TECHNOLOGY, Liaoning (CN)

(72) Inventors: Yongchen Song, Liaoning (CN); Yanghui Li, Liaoning (CN); Peng Wu, Liaoning (CN); Weiguo Liu, Liaoning (CN); Jiafei Zhao, Liaoning (CN); Mingjun Yang, Liaoning (CN); Yu Liu, Liaoning (CN); Lei Yang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/968,818

(22) PCT Filed: Nov. 18, 2019

(86) PCT No.: PCT/CN2019/119107
§ 371 (c)(1),
(2) Date: Aug. 10, 2020

(87) PCT Pub. No.: WO2020/119394
PCT Pub. Date: Jun. 18, 2020

(65) Prior Publication Data
US 2021/0003517 A1    Jan. 7, 2021

(30) Foreign Application Priority Data

Dec. 11, 2018 (CN) .......................... 201811509193.8

(51) Int. Cl.
*G01N 23/046* (2018.01)
*G01N 3/12* (2006.01)

(52) U.S. Cl.
CPC ............. *G01N 23/046* (2013.01); *G01N 3/12* (2013.01)

(58) Field of Classification Search
CPC ............................ G01N 23/046; G01N 3/12
See application file for complete search history.

(56) References Cited

U.S. PATENT DOCUMENTS

2014/0072104 A1    3/2014    Jacobsen et al.
2019/0360948 A1*   11/2019   Lee .......................... G01N 33/24

FOREIGN PATENT DOCUMENTS

CN    103424414 A    12/2013
CN    103616290 A    3/2014
(Continued)

*Primary Examiner* — Michael C Bryant
(74) *Attorney, Agent, or Firm* — Muncy, Geissler, Olds & Lowe, P.C.

(57) ABSTRACT

The present invention provides a CT triaxial test apparatus for hydrate-bearing sediment, and belongs to the technical field of fundamental physical property measurement of geotechnical engineering. In the apparatus, aiming at the defects of the invention "a visual test apparatus for mechanical characteristics of natural gas hydrate-bearing sediment", the CT triaxial test apparatus for hydrate-bearing sediment is redesigned and optimized, on the premise of obtaining static and dynamic mechanical characteristics and creep characteristics of a hydrate reservoir, the stability of the triaxial apparatus during rotation due to scanning, the temperature control accuracy of a hydrate-bearing sample, and the X-ray penetration performance of the pressure chamber of the triaxial apparatus are improved, an optimal CT imaging effect is obtained, and powerful hardware support is provided to ascertain the reservoir deformation mechanism during hydrate decomposition.

3 Claims, 7 Drawing Sheets

(56) References Cited

FOREIGN PATENT DOCUMENTS

| CN | 103868801 | A |   | 6/2014  |
|----|-----------|---|---|---------|
| CN | 104155188 | A | * | 11/2014 |
| CN | 104155188 | B |   | 5/2016  |
| CN | 106644729 | A |   | 5/2017  |
| CN | 109668916 | A |   | 4/2019  |
| CN | 110274833 | A | * | 9/2019  |

* cited by examiner

CT TRIAXIAL TEST APPARATUS FOR HYDRATE-BEARING SEDIMENT

TECHNICAL FIELD

The present invention relates to a CT triaxial test apparatus for hydrate-bearing sediment, and belongs to the field of fundamental physical property measurement of geotechnical engineering.

BACKGROUND

Hydrate-bearing sediment is of a metastable state structure with complex mechanical behavior characteristics, and the exploitation process thereof often involves hydrate phase change, particle migration, cementation structure destruction and other microstructure changes, so there is a need to analyze the physical mechanism from particle scale microcosmically to clarify the formation mechanism of geological disasters such as stratum settlement, submarine landslide, etc. induced by the decomposition of natural gas hydrate.

A triaxial apparatus is a frequently-used geotechnical engineering test apparatus that simulates stratum stress state. The existing triaxial apparatus for natural gas hydrate has relatively large size and weight in general due to the need to meet the conditions of low temperature, high pressure, etc., and has the problems such as poor X-ray penetration performance, inconvenient rotation during scanning, etc., so it is unable to achieve organic integration with X-ray CT and other visual devices, for example, inspeXio SMX-255CT which objective table allowing maximum weight of 9 kg and sample height of less than or equal to 30 cm, and then it is impossible to observe the microstructure change in the deformation process of hydrate-bearing sediment. Therefore, Dalian University of Technology first innovatively proposed a visual test apparatus for mechanical characteristics of natural gas hydrate-bearing sediment in 2014 (201410357319.X), which achieves the organic integration of a triaxial apparatus for natural gas hydrate and X-ray CT. However, the apparatus has certain problems in the actual use process: 1. Since the loading device is located on the upper part of the main machine of the triaxial apparatus, the center of gravity of the triaxial apparatus is slightly higher, so during the rotation due to X-ray scanning, the main machine of the triaxial apparatus is not stable enough, which is easy to cause ghosting of the obtained CT image; 2. The pressure chamber of the apparatus is made of pure aluminum, aluminum alloy or other low-density material which has good heat-conduction performance and is easy to cause heat loss, if the temperature of the sample is controlled by injecting pre-cooled hydraulic fluid and the test time is relatively long, the temperature of the hydraulic fluid could be greatly affected by the environment, which may cause hydrate decomposition and ultimately affect the accuracy of the test data; and 3. The pressure chamber of the apparatus is integrally designed without fully considering the structural features and functions of the each part, and if the upper part of the pressure chamber is made of aluminum alloy material with high strength and low density and the wall of the pressure chamber is made of engineering plastic with better penetration performance, a better CT imaging effect may be obtained. In FIG. 1, by comparing the CT scan image of sediment obtained by applying the present invention with the CT scan image of sediment obtained by the invention "a visual test apparatus for mechanical characteristics of natural gas hydrate-bearing sediment" 201410357319.X, it can be found that the CT imaging quality is greatly improved.

Aiming at the defects of the invention "a visual test apparatus for mechanical characteristics of natural gas hydrate-bearing sediment" 201410357319.X, Dalian University of Technology redesigned and optimized the CT triaxial test apparatus for hydrate-bearing sediment. On the premise of obtaining static and dynamic mechanical characteristics and creep characteristics of a hydrate reservoir, the stability of the triaxial apparatus during rotation due to scanning, the temperature control accuracy of a hydrate-bearing sample, and the X-ray penetration performance of the pressure chamber of the triaxial apparatus are improved, an optimal CT imaging effect is obtained, and powerful hardware support is provided to ascertain the reservoir deformation mechanism during hydrate decomposition.

SUMMARY

The present invention provides a CT triaxial test apparatus for hydrate-bearing sediment, which achieves an optimal CT imaging effect on the premise of obtaining macro-mechanical data of a hydrate reservoir, and provides technical guarantee to ascertain the reservoir deformation mechanism during hydrate decomposition.

The technical solution of the present invention is:

A CT triaxial test apparatus for hydrate-bearing sediment, comprising a water bath jacket 1, a pressure chamber 2, a coolant channel 3, a tip cone 4, an upper indenter 5, upper porous stone 6, lower porous stone 7, a sediment sample 8, a rubber membrane 9, a lower indenter 10, a loading piston 11, a flange 12, a thermocouple 17, a hydraulic cylinder 18, an axial displacement sensor 19, a baffle 21 and a bottom fixing bracket 22, wherein the water bath jacket 1 is covered above the pressure chamber 2 and is fixed to the upper surface of the pressure chamber 2 by bolts, the water bath jacket 1 and the pressure chamber 2 are sealed by an O-ring, and the coolant channel 3 is provided on the upper part of the water bath jacket 1; and the water bath jacket 1 is made of material with good heat insulation performance, so coolant heat loss is reduced. Meanwhile, the water bath jacket 1 avoids the X-ray scan area, and reduces the X-ray attenuation during an experiment, so the CT imaging quality is not affected while guaranteeing the temperature control effect of the coolant. The pressure chamber 2 is made of two material and is divided into three parts on the whole, and the three parts are sealed by O-rings and are fastened by bolts; the upper part and the lower part are made of aluminum alloy material with good heat-conduction performance, high strength and low density, and the middle part is made of engineering plastic with poor heat-conduction performance, high strength and good X-ray penetration performance. On the one hand, since the middle part is made of engineering plastic, the X-ray penetration performance of the pressure chamber is improved, the heat loss of the pressure chamber is reduced, and the temperature control accuracy is improved. On the other hand, since the upper part of the pressure chamber is made of aluminum alloy material, and the inner side is machined with spiral rib plates, the strength of the pressure chamber is satisfied, and the efficiency of heat transfer between the coolant and the inside of the pressure chamber is guaranteed, maintaining a stable temperature in the pressure chamber.

The tip cone 4 is mounted on the upper part of the pressure chamber 2, and the rod of the tip cone 4 is machined with threads to be mounted cooperatively with the pressure chamber 2; in order to enhance the stability of the tip cone 4, a bolt with the same diameter as that of the rod of the tip cone 4 is mounted on the upper part of the tip cone 4; and the tip cone 4 comes into contact with the upper indenter 5.

The upper porous stone 6, the sediment sample 8, the lower porous stone 7 and the lower indenter 10 are provided on the lower part of the upper indenter 5 in sequence; and the lower half of the upper indenter 5, the upper porous stone 6, the sediment sample 8, the lower porous stone 7, and the upper half of the lower indenter 10 are wrapped with the rubber membrane 9.

The lower indenter 10 and the loading piston 11 are fixedly connected by threads.

The loading piston 11 moves up and down in the hydraulic cylinder 18 and is sealed by a seal ring.

The lower part of the pressure chamber 2 comes into contact with the flange 12, and the two are sealed by O-rings and are fastened by bolts; the flange 12 is internally provided with four channels: channel B 13, channel C 14, channel D 15 and channel E 16, which are thermocouple 17 channel, confining pressure control channel, pore pressure control channel and back pressure control channel. Wherein, in the main machine of the triaxial apparatus, the thermocouple 17 is mounted at the exit of the channel B 13, and the channel D 15 and the channel E 16 are connected with the lower indenter 10 and the upper indenter 5 by flexible pressure-resistant nylon tubes respectively.

The flange 12 and the hydraulic cylinder 18 are sealed by O-rings and are fastened by bolts.

The axial displacement sensor 19 is fixed on the side surface of the hydraulic cylinder 18; and the lower part of the side surface of the hydraulic cylinder 18 is provided with a channel F 20 for the injection of hydraulic fluid to control axial loading.

The baffle 21 is mounted at the bottom of the loading piston 11, the baffle 21 and the loading piston 11 are connected by bolts, and the baffle 21 and the axial displacement sensor 19 come into contact with each other, to achieve real-time feedback of axial displacement.

The bottom fixing bracket 22 is fixed on the lower part of the hydraulic cylinder 18, and the hydraulic cylinder 18 and the bottom fixing bracket 22 are connected by bolts to rotate the CT triaxial test apparatus for hydrate-bearing sediment on the micro-focus CT objective table.

An axial loading mechanism composed of the loading piston 11, the flange 12 and the hydraulic cylinder 18 is located below the triaxial apparatus for hydrate on the whole, reducing the center of gravity of the entire apparatus, and enhancing the stability of the CT triaxial test apparatus for hydrate-bearing sediment in the CT scan process.

The present invention has the following beneficial effects:

(1) On the premise of satisfying the condition of organic integration of a triaxial apparatus for hydrate and an X-ray CT system, a CT triaxial test apparatus for hydrate-bearing sediment is redesigned and optimized, the stability of the main machine of the triaxial apparatus during rotation due to scanning, the temperature control accuracy of a hydrate-bearing sample, and the X-ray penetration performance of the pressure chamber of the triaxial apparatus are improved, and an optimal CT imaging effect is obtained.

(2) The pressure chamber 2 is made of two material, the upper part and the lower part are made of aluminum alloy material with good heat-conduction performance, high strength and low density, and the middle part is made of engineering plastic with poor heat-conduction performance, high strength and good X-ray penetration performance. On the one hand, the X-ray penetration performance of the pressure chamber is improved, the heat loss of the pressure chamber is reduced, and the temperature control accuracy is improved. On the other hand, since the upper part of the pressure chamber 2 is made of aluminum alloy material, and the inner side is machined with spiral rib plates, the strength of the pressure chamber is satisfied, and the efficiency of heat transfer between the coolant and the inside of the pressure chamber is guaranteed, maintaining a stable temperature in the pressure chamber.

(3) The water bath jacket 1 is made of material with good heat insulation performance, so coolant heat loss is reduced. Meanwhile, the water bath jacket 1 avoids the X-ray scan area, which could reduce the X-ray attenuation during experiment, so the CT imaging quality is not affected while guaranteeing the temperature control effect of the coolant.

(4) An axial loading mechanism composed of the loading piston 11, the flange 12 and the hydraulic cylinder 18 is located below the triaxial test apparatus on the whole, reducing the center of gravity of the entire apparatus, and enhancing the stability of the CT triaxial test apparatus for hydrate-bearing sediment in the CT scan process.

In the figure: 1. water bath jacket; 2. pressure chamber; 3. coolant channel a; 4. tip cone; 5. upper indenter; 6. upper porous stone; 7. lower porous stone; 8. sediment sample; 9. rubber membrane; 10. lower indenter; 11. loading piston; 12. flange; 13. channel B thermocouple; 14. channel C confining pressure; 15. channel D pore pressure inlet; 16. channel E back pressure; 17. thermocouple; 18. hydraulic cylinder; 19. axial displacement sensor; 20. channel F axis pressure; 21. baffle; 22. bottom fixing bracket; 23. pore pressure of high-precision pressure/volume controller; 24. axis pressure of high-precision pressure/volume controller; 25. confining pressure of high-precision pressure/volume controller; 26. confining pressure of nitrogen gas source; 27. pore pressure of xenon gas source; 28. pore pressure of nitrogen gas source; 29$a$, 29$b$, 29$c$, 29$d$, 29$e$, 29$f$, 29$g$, 29$h$: needle valve; 30. back pressure valve; 31. gas-water separator; 32. gas flowmeter; 33. water bath; 34. X-ray transmitter; 35. X-ray receiver; 36. data collector; 37. CT triaxial test apparatus for hydrate-bearing sediment.

DETAILED DESCRIPTION

Specific embodiment of the present invention is further described below in combination with accompanying drawings and the technical solution.

Figure 1:
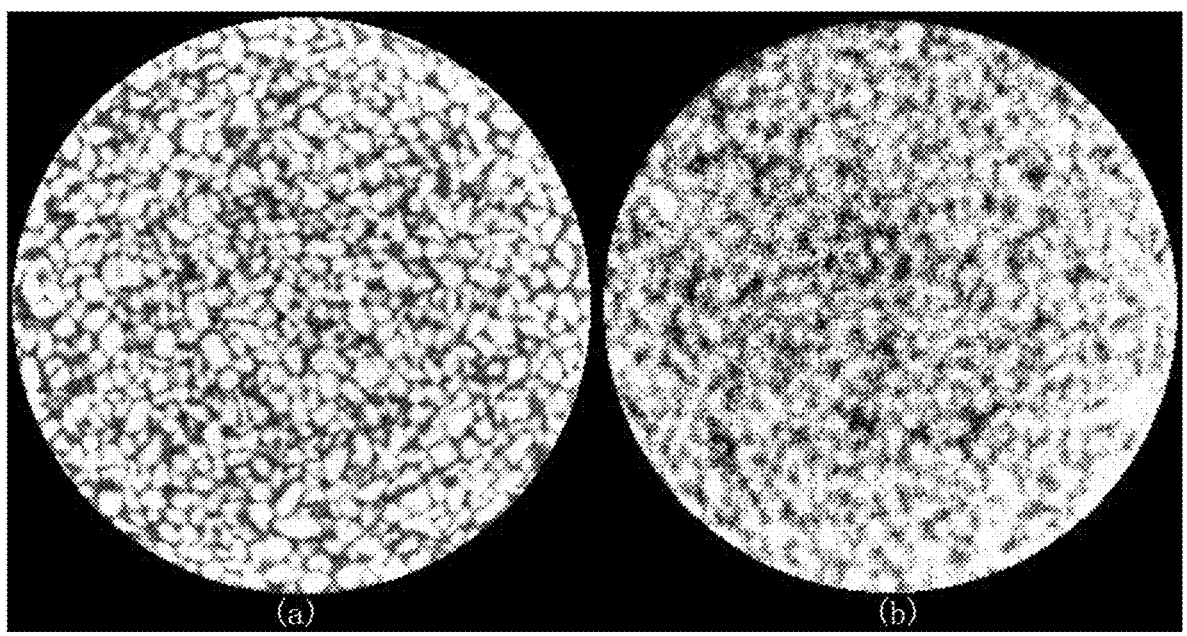
FIG. 1 shows CT scan images of sediment, where (a) is a CT scan image of sediment obtained by applying the present invention; and (b) is a CT scan image of sediment obtained by the invention in 2014.
Figure 2:
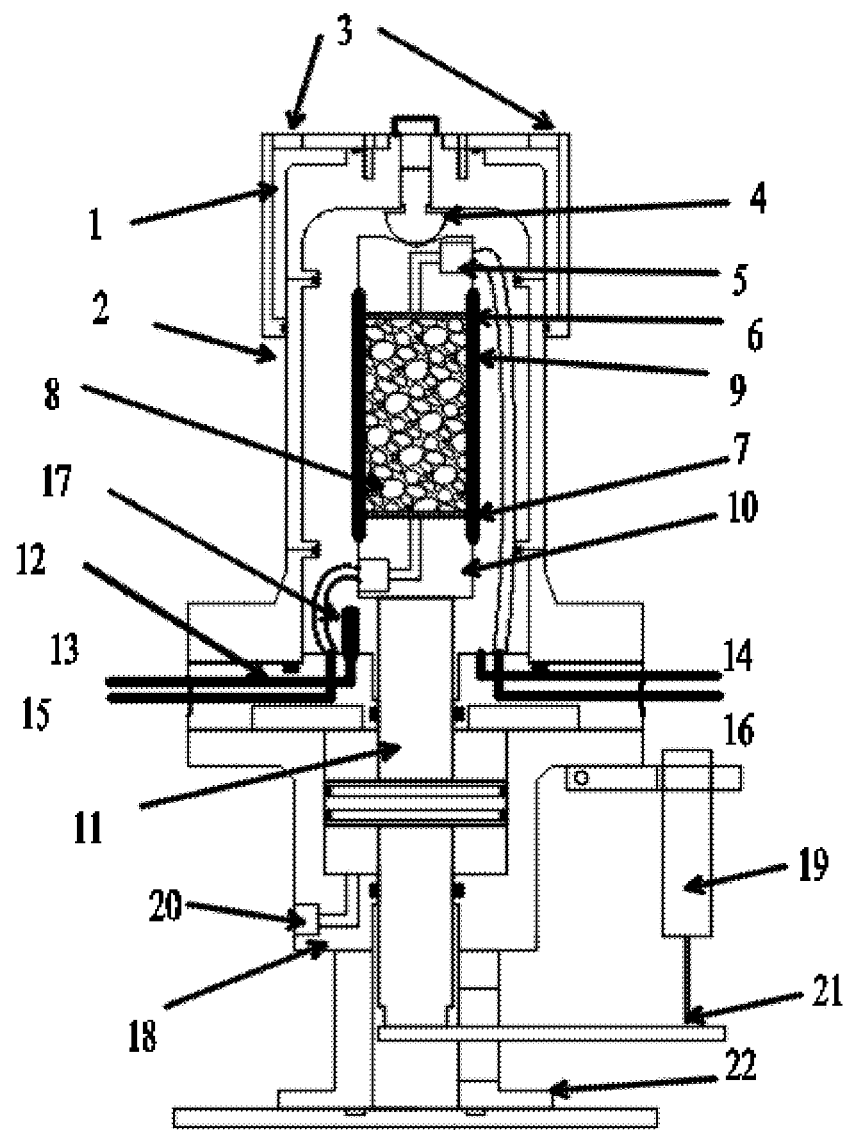
FIG. 2 is a structural diagram of a CT triaxial test apparatus for hydrate-bearing sediment.
Figure 3:
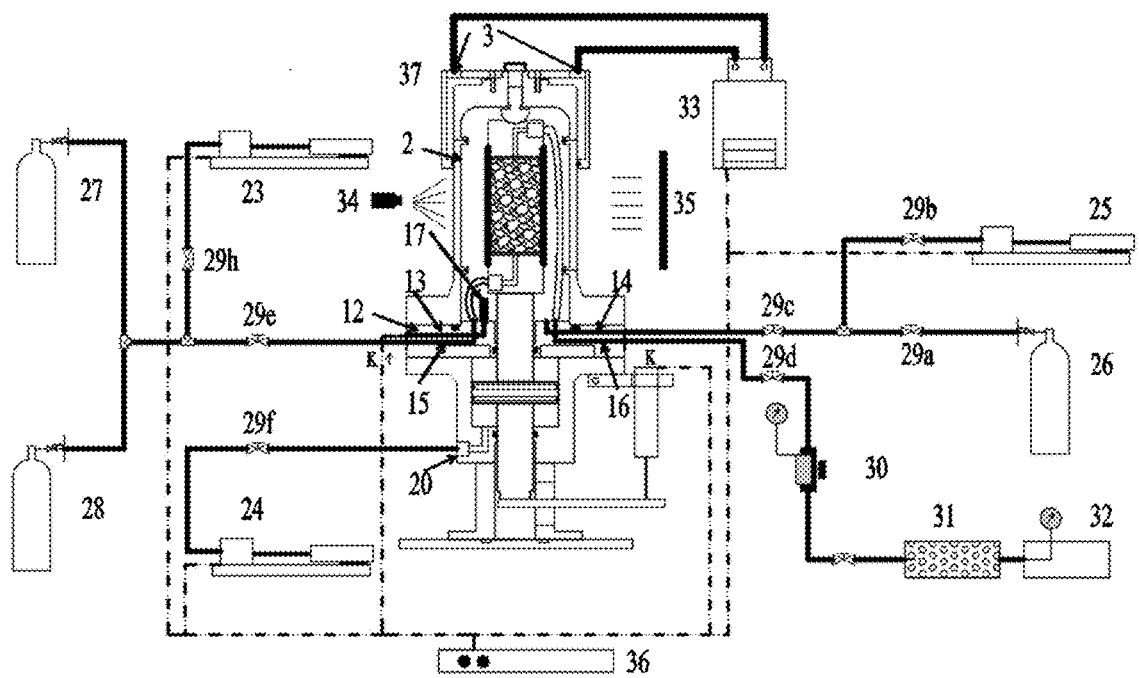
FIG. 3 is a systematic diagram of a CT triaxial test apparatus for hydrate-bearing sediment.

(1) Tube connection: fixing the bottom fixing bracket 22 of the CT triaxial test apparatus for hydrate-bearing sediment 37 to a micro-focus CT objective table; according to FIG. 3, connecting the coolant channel A3 of the CT triaxial test apparatus for hydrate-bearing sediment 37 with the water bath 33 by a flexible tube to control the temperature of the pressure chamber 2; connecting the channel C 14 of the CT triaxial test apparatus for hydrate-bearing sediment 37 with the high-precision pressure/volume controller 25 and the nitrogen gas source 26 by flexible pressure-resistant tubes through the needle valves 29a, 29b and 29c respectively to control the confining pressure of the sediment sample 8; connecting the channel D 15 of the CT triaxial test apparatus for hydrate-bearing sediment 37 with the high-precision pressure/volume controller 23, the xenon gas source 27 and the nitrogen gas source 28 by flexible pressure-resistant tubes through the needle valves 29e and 29h respectively to control the pore pressure of the sediment sample 8, wherein the xenon gas source 27 is used to supply gas required for in-situ generation of hydrate for the sediment sample 8, and the nitrogen gas source 28 is mainly used for tube leak detection; connecting the channel D 16 of the CT triaxial test apparatus for hydrate-bearing sediment 37 with the back pressure valve 30, the gas-water separator 31 and the gas flowmeter 32 by flexible pressure-resistant tubes through the needle valve 29d respectively to control the back pressure of the sediment sample 8, wherein the gas flowmeter 32 is used to calculate the hydrate saturation change of the sediment sample 8 in the decomposition experiment; connecting the channel F 20 of the CT triaxial test apparatus for hydrate-bearing sediment 37 with the high-precision pressure/volume controller 24 by a flexible pressure-resistant tube through the needle valve 29f to achieve axial loading; and connecting the thermocouple 17 in the channel B 13 of the CT triaxial test apparatus for hydrate-bearing sediment 37, the high-precision pressure/volume controller 23, the high-precision pressure/volume controller 24, the high-precision pressure/volume controller 25, the axial displacement sensor 19, the water bath 33 with the data collector 36 to achieve data collection during the experiment of the CT triaxial test apparatus for hydrate-bearing sediment 37.

(2) Sample preparation: according to the required sample porosity and hydrate saturation, uniformly mixing a certain amount of ice powder with sand in a freezer at −15° C., compacting in 15 layers in a sample compaction cylinder using a compaction hammer, making a cylindrical sample of ice-sand mixture, freezing for 6 h, removing the sample compaction cylinder and taking out the sample.

(3) Sample installation: removing the bolts between the flange 12 and the pressure chamber 2, and opening the pressure chamber 2; placing the lower porous stone 7, the sediment sample 8, the upper porous stone 6, the upper indenter 5 on the lower indenter 10 in sequence, wrapping the rubber membrane 9, closing the pressure chamber 2, and tightening the bolts between the flange 12 and the pressure chamber 2.

(4) Sample saturation: opening the needle valve 29a, the needle valve 29b and the needle valve 29c; opening the nitrogen gas source 26, injecting nitrogen into the pressure chamber 2 and the high-precision pressure/volume controller 25 through the needle valve 29a, the needle valve 29c and the needle valve respectively, and closing the needle valve 29a and the nitrogen gas source 26 when the pressure in the high-precision pressure/volume controller 25 rises to 0.2 MPa; opening the needle valve 29h and the needle valve 29e, and adjusting the back pressure valve 30 to the highest level; opening the xenon gas source 27, injecting xenon into the high-precision pressure/volume controller 23 and the sediment sample 8 through the needle valve 29h and the needle valve 29e respectively, and closing the xenon gas source 27 when the pressure of the high-precision pressure/volume controller 23 rises to 0.1 MPa; adjusting the high-precision pressure/volume controller 25 and the high-precision pressure/volume controller 23, controlling the increase rate of confining pressure to be identical to the increase rate of pore pressure, and always keeping that the confining pressure is 0.1 MPa higher than the pore pressure until the confining pressure and pore pressure reach 0.7 MPa and 0.6 MPa respectively; adjusting the high-precision pressure/volume controller 25 and the high-precision pressure/volume controller 23 to a constant pressure mode; turning on the water bath 33, and adjusting the temperature of nitrogen in the pressure chamber 2 to 18° C. to melt ice in the sediment sample 8; obtaining the temperature of nitrogen in the pressure chamber 2 through the thermocouple 17; and considering that the sediment sample 8 reaches full gas saturation when the volume of xenon in the high-precision pressure/volume controller 23 is not consumed any longer.

(5) In-situ generation of hydrate: adjusting the water bath 33, and adjusting the temperature of nitrogen in the pressure chamber 2 to 7° C., to make the temperature of the sediment sample 8 be lower than the hydrate phase equilibrium temperature; if the gas volume in the high-precision pressure/volume controller 23 is not changed significantly, indicating that water in the pores of the sediment sample 8 has completely reacted with xenon to generate xenon hydrate; and according to the change in the xenon volume in the high-precision pressure/volume controller 23, calculating the saturation of hydrate.

(6) Sample consolidation: according to the specific experiment conditions, adjusting and maintaining the pressure of the high-precision pressure/volume controller 25 and the high-precision pressure/volume controller 23 to release the ultra-static pore pressure inside the sediment sample 8 so as to achieve the consolidation of the sediment sample 8, and considering that the consolidation of the sediment sample 8 is completed when the volume of the high-precision pressure/volume controller 23 is not changed any longer.

(7) Sample shearing: setting and maintaining the injection flow rate of hydraulic fluid in the high-precision pressure/volume controller 24 according to the shearing rate required by the experiment to push the loading piston 11 to shear the sediment sample 8, collecting pressure change amount of the high-precision pressure/volume controller 24 and the displacement change amount of the axial displacement sensor 19 in the shearing process by the data collector 36 to obtain a stress-strain curve of the sediment sample 8 in the shearing process; and when a CT scan is to be performed, suspending axial loading to prevent CT image ghosting.

Figure 4:
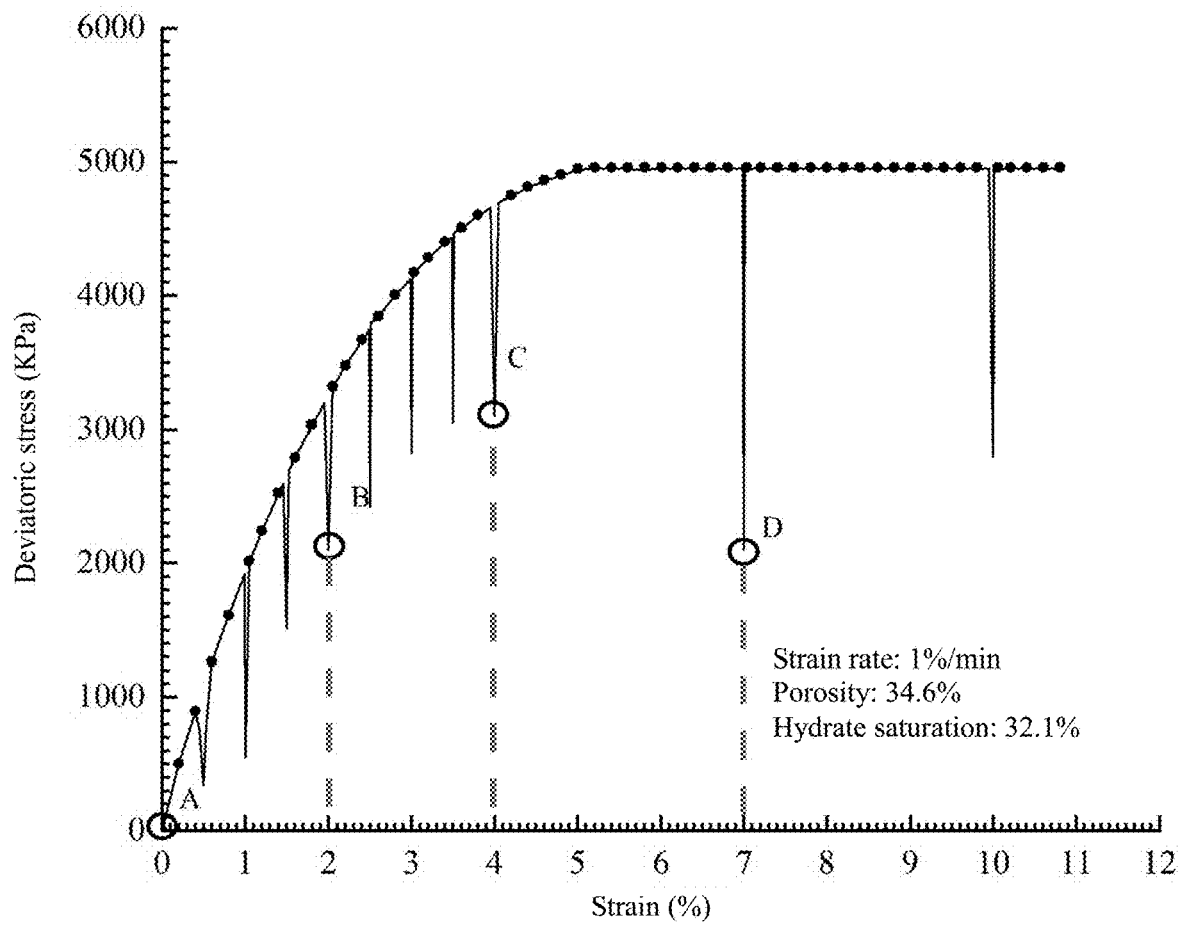
FIG. 4 shows a stress-strain curve of a hydrate-bearing sediment sample.
Figure 5:
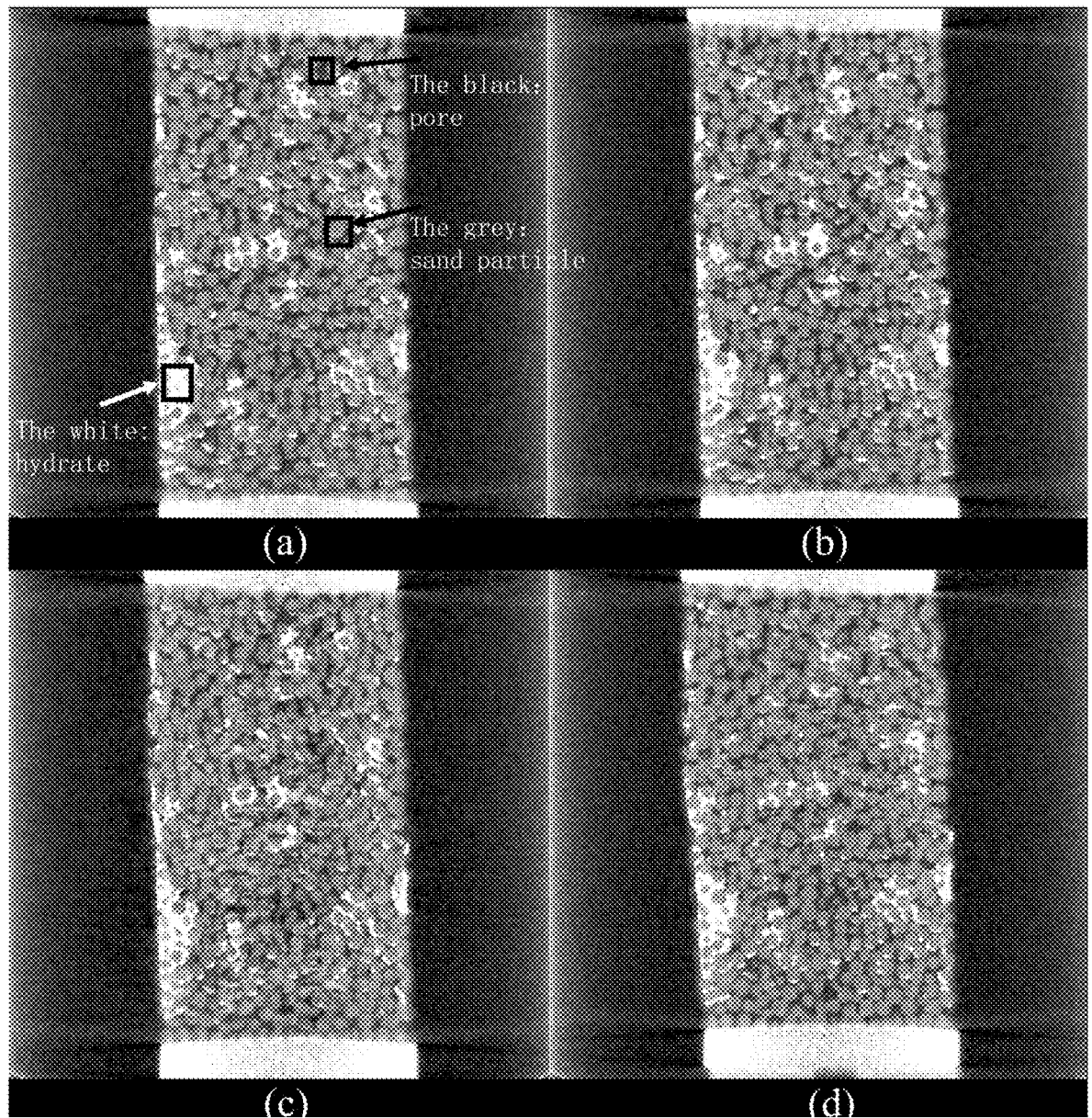
FIG. 5 shows the whole of the CT scan image of the sample under various strains, where (a) is axial strain: 0%; (b) is axial strain: 2%; (c) is axial strain: 4%; (d) is axial strain: 7%.
Figure 6:
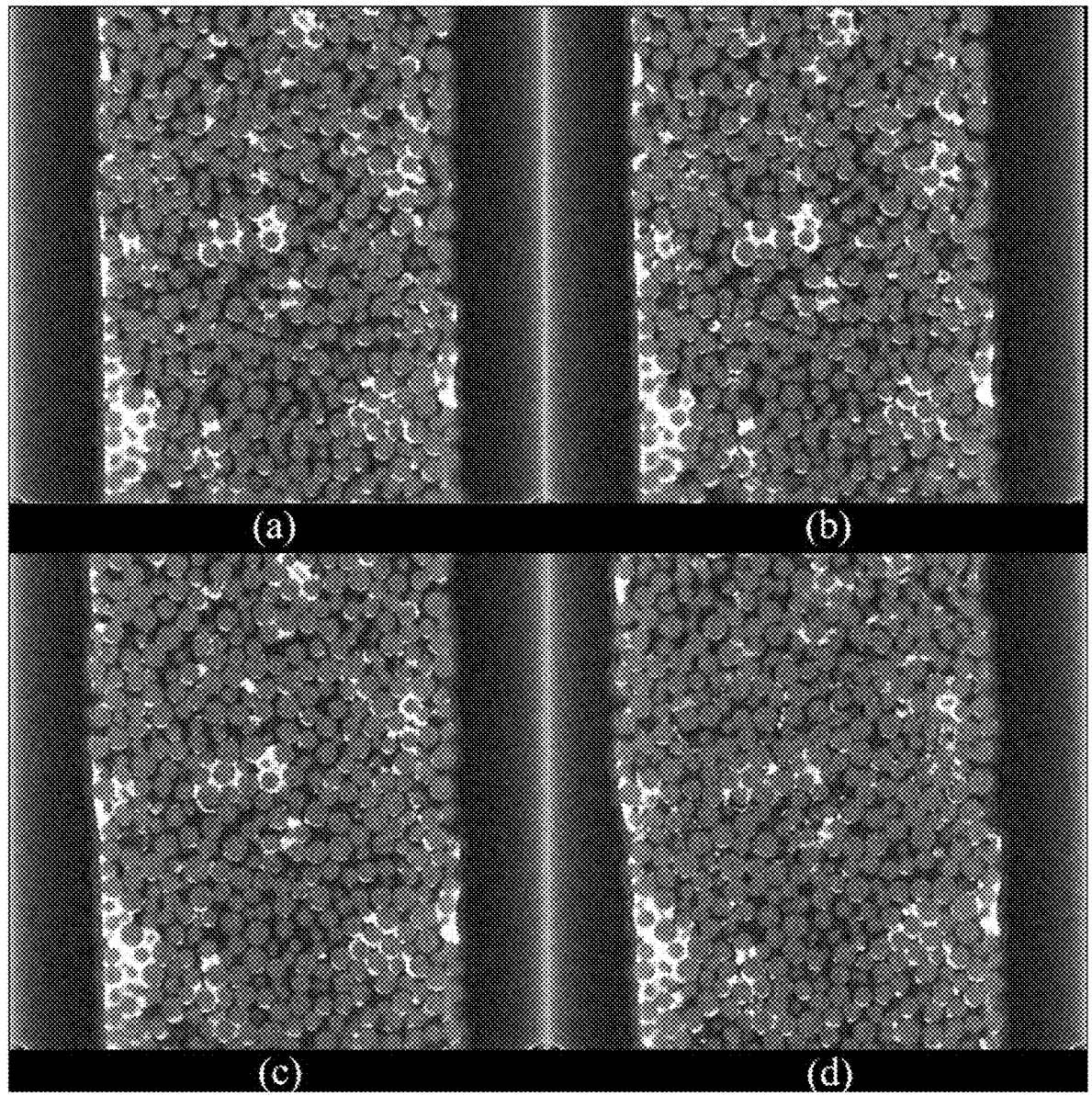
FIG. 6 shows the middle part of the CT scan image of the sample under various strains, where (a) is axial strain: 0%; (b) is axial strain: 2%; (c) is axial strain: 4%; (d) is axial strain: 7%.
Figure 7:
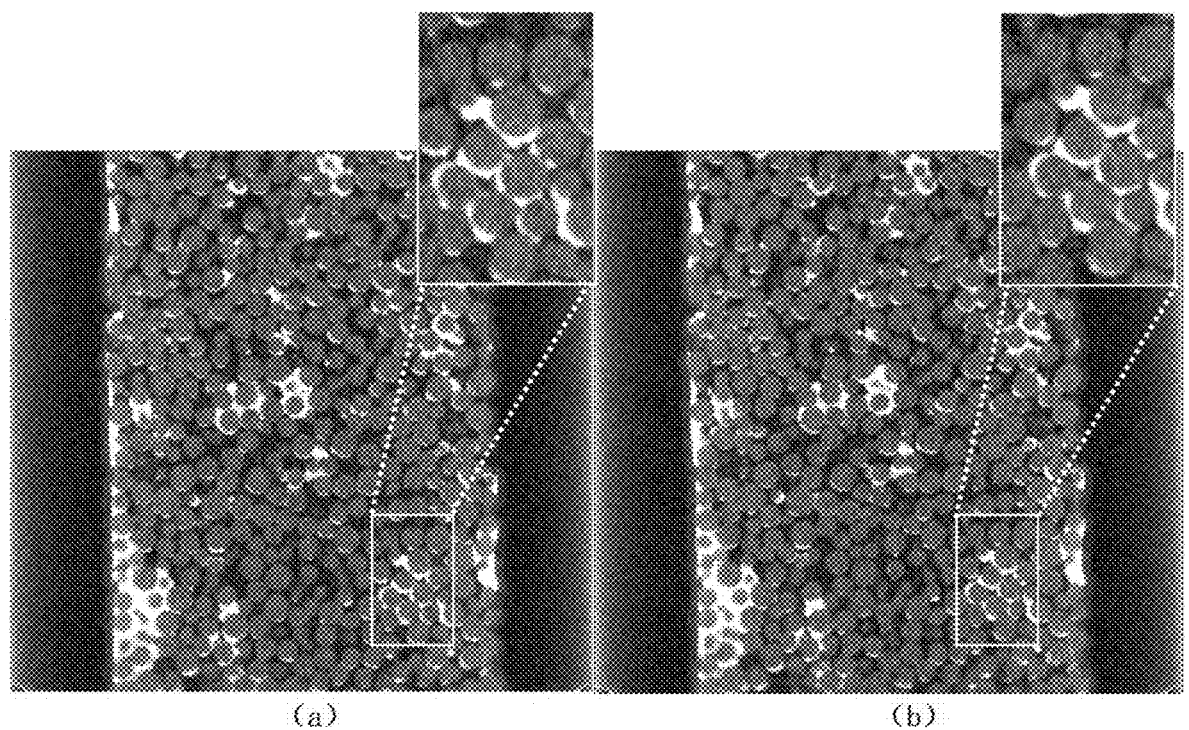
FIG. 7 is a comparison diagram showing damage of the cemented structure of the sample under strains of 0% and 2%, where (a) is axial strain: 0%; (b) is axial strain: 2%.
Figure 8:
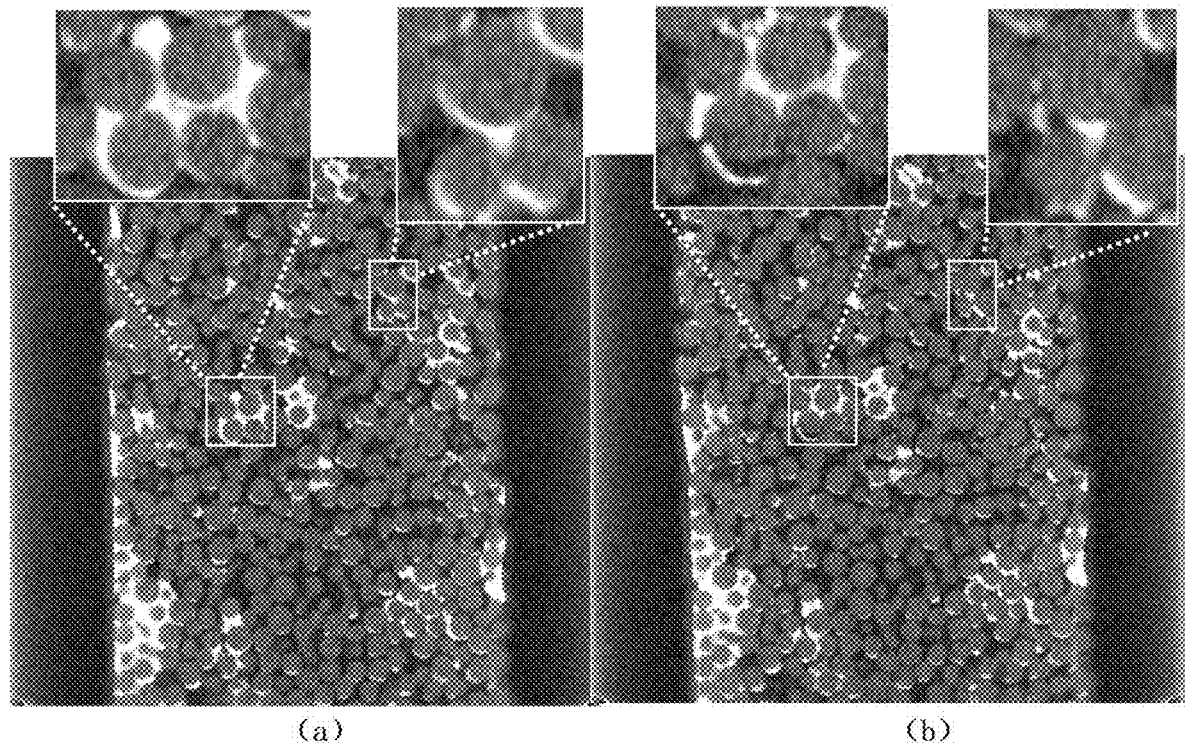
FIG. 8 is a comparison diagram showing damage of the cemented structure of the sample under strains of 0% and 4%, where (a) is axial strain: 0%; (b) is axial strain: 4%.
Figure 9:
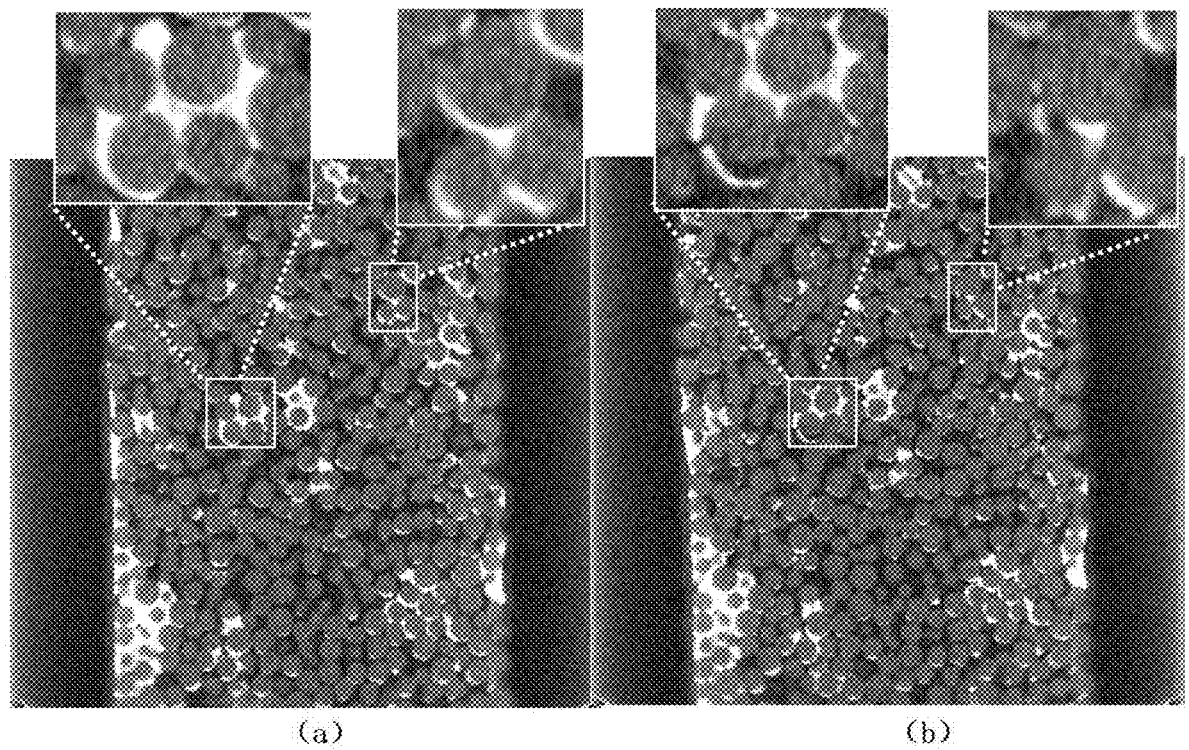
FIG. 9 is a comparison diagram showing damage of the cemented structure of the sample under strains of 0% and 7%, where (a) is axial strain: 0%; (b) is axial strain: 7%.
Figure 10:
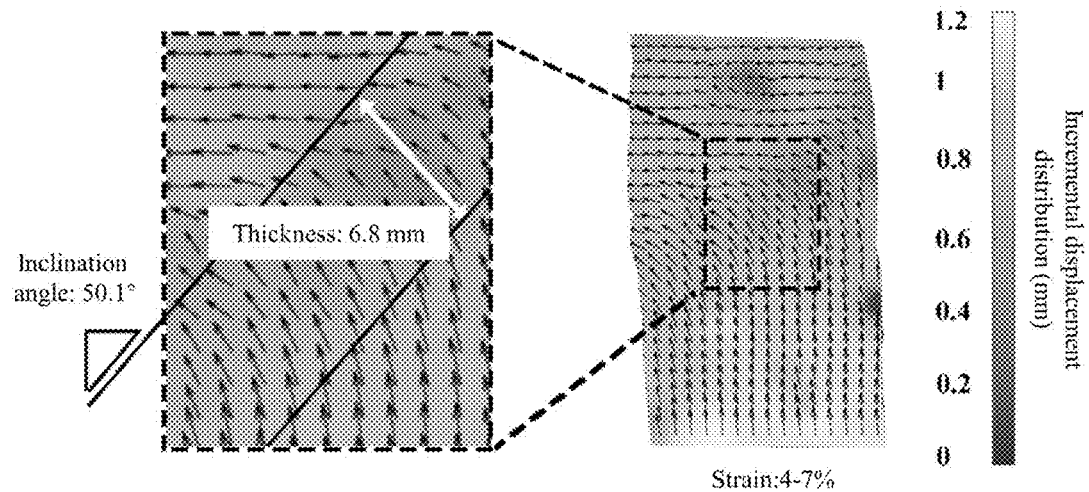
FIG. 10 is a recognition diagram of a shear band inside the sample.

(8) Data analysis: the stress-strain curve obtained according to the above steps is shown in FIG. 4 and can be divided into three stages: linear stage as first stage having axial strain of 0%-2%: at this stage, the deviatoric stress almost linearly increases with the increase of the axial strain, and the sample exhibits elastic characteristics on the whole; plastic stage having axial strain of 2%-4%: at this stage, the deviatoric stress gradually decreases with the increase of the axial strain; and yield stage having axial strain of 4%-10%: at this stage, the deviatoric stress hardly changes with the increase of the axial strain. FIGS. 5 and 6 show the whole and the middle part of the CT scan image of the sediment sample 8 under strains of 0%, 2%, 4% and 7% respectively, wherein the white part represents hydrate, the gray part represents sand particles, and the black part represents pores. It can be seen from FIG. 7 that at the linear stage having axial strain of 0%-2%, the cementation structure in the sediment sample 8 is not significantly damaged. As the axial strain continues to increase, when the sediment sample 8 enters the plastic stage having axial strain of 2%-4%, it can be seen from FIG. 8 that the hydrate is significantly peeled. When entering the yield stage having axial strain of 4%-10%, it can be seen from FIG. 9 that the hydrate inside the sediment sample 8 is significantly crushed and destroyed on a large scale. By performing Particle Image Velocimetry analysis on the longitudinal sectional view of the sediment sample 8 when the axial strains are 4% and 7%, an obvious shear band image can be obtained, as shown in FIG. 10, the shear band has an inclination angle of 50.1° and a thickness of 6.8 mm.

The invention claimed is:

1. A CT triaxial test apparatus for hydrate-bearing sediment, comprising a water bath jacket, a pressure chamber, a coolant channel, a tip cone, an upper indenter, upper porous stone, lower porous stone, a sediment sample, a rubber membrane, a lower indenter, a loading piston, a flange, a thermocouple, a hydraulic cylinder, an axial displacement sensor, a baffle and a bottom fixing bracket, wherein the water bath jacket is covered above the pressure chamber and is fixed to the upper surface of the pressure chamber by bolts, the water bath jacket and the pressure chamber are sealed by an O-ring, and the coolant channel is provided on the upper part of the water bath jacket;

the pressure chamber is made of two materials and is divided into three parts comprising upper, middle and lower parts respectively on the whole, and the three parts are sealed by O-rings and are fastened by bolts; the upper part and the lower part are made of aluminum alloy material, and the middle part is made of plastic;

the tip cone is mounted on the upper part of the pressure chamber, the rod of the tip cone is machined with threads to be mounted cooperatively with the pressure chamber; and the tip cone comes into contact with the upper indenter;

the upper porous stone, the sediment sample, the lower porous stone and the lower indenter are provided on the lower part of the upper indenter in sequence; and the lower half of the upper indenter, the upper porous stone, the sediment sample, the lower porous stone, and the upper half of the lower indenter are wrapped with the rubber membrane;

the lower indenter and the loading piston are fixedly connected by threads;

the loading piston moves up and down in the hydraulic cylinder and is sealed by a seal ring;

the lower part of the pressure chamber comes into contact with the flange, and the two are sealed by O-rings and fastened by bolts; the flange is internally provided with four channels: channel B, channel C, channel D and channel E, which are thermocouple channel, confining pressure control channel, pore pressure control channel and back pressure control channel; wherein, in a main machine of a triaxial apparatus, the thermocouple is mounted at the exit of the channel B, and the channel D and the channel E are connected with the lower indenter and the upper indenter by flexible pressure-resistant nylon tubes respectively;

the flange and the hydraulic cylinder are sealed by O-rings and are fastened by bolts;

the axial displacement sensor is fixed on the side surface of the hydraulic cylinder; and the lower part of the side surface of the hydraulic cylinder is provided with a channel F for the injection of hydraulic fluid to control axial loading;

the baffle is mounted at the bottom of the loading piston, the baffle and the loading piston are connected by bolts, and the baffle and the axial displacement sensor come into contact with each other, to achieve real-time feedback of axial displacement;

the bottom fixing bracket is fixed on the lower part of the hydraulic cylinder, and the hydraulic cylinder and the bottom fixing bracket are connected by bolts to rotate the CT triaxial test apparatus for hydrate-bearing sediment on a micro-focus CT objective table; and an axial loading mechanism composed of the loading piston, the flange and the hydraulic cylinder is located below the triaxial apparatus for hydrate on the whole, reducing the center of gravity of the entire apparatus, and enhancing the stability of the CT triaxial apparatus for hydrate-bearing sediment in a CT scan process.

2. The CT triaxial test apparatus for hydrate-bearing sediment according to claim 1, wherein in order to enhance the stability of the tip cone, a bolt with the same diameter as that of the rod of the tip cone is mounted on the upper part of the tip cone.

3. The CT triaxial test apparatus for hydrate-bearing sediment according to claim 1, wherein the water bath jacket is made of material with heat insulation performance, and the inner side of the aluminum alloy material of the upper part of the pressure chamber is machined with spiral rib plates, to reduce the coolant heat loss and improve the heat exchange efficiency.

* * * * *